June 9, 1964     R. V. HANSEN     3,136,033
METHOD AND APPARATUS FOR PRODUCING PERMANENT MAGNETS
Filed July 17, 1961
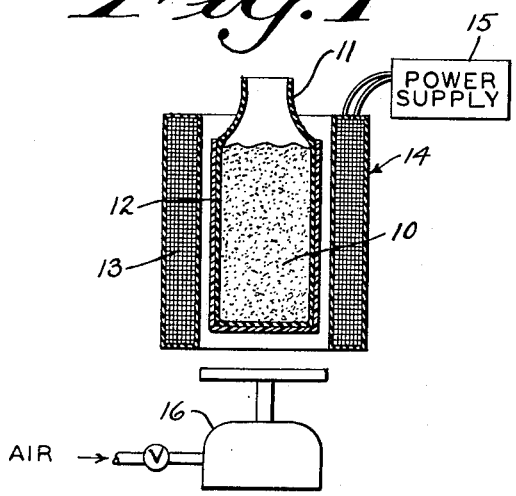
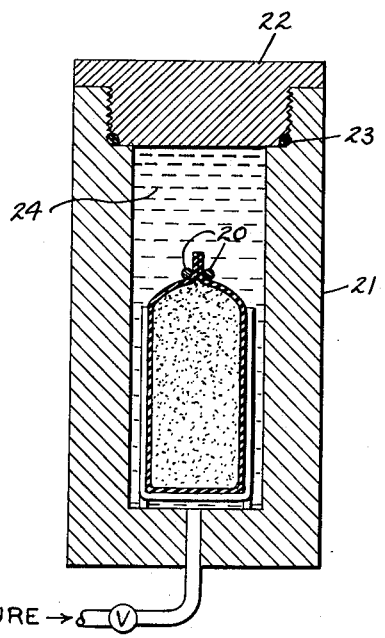
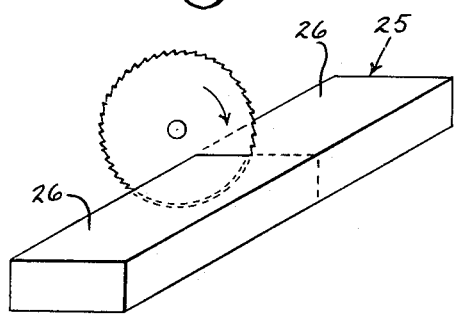
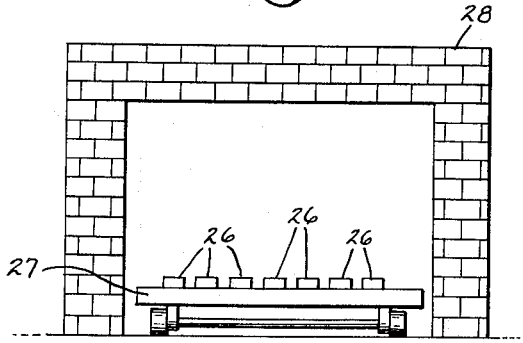
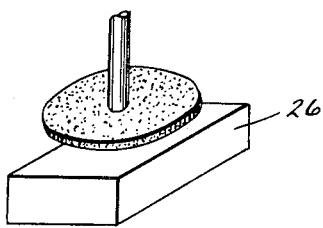
INVENTOR
ROBERT V. HANSEN
BY
ATTORNEY

United States Patent Office 3,136,033
Patented June 9, 1964

3,136,033
METHOD AND APPARATUS FOR PRODUCING
PERMANENT MAGNETS
Robert V. Hansen, Milwaukee, Wis., assignor to Allen-Bradley Company, Milwaukee, Wis., a corporation of Wisconsin
Filed July 17, 1961, Ser. No. 124,634
5 Claims. (Cl. 29—155.6)

The present invention relates to magnetically-anisotropic permanent magnet bodies prepared from ferrite materials and to methods and apparatus for making the same. In particular, this invention is directed to the manufacture of permanent magnets and including the steps of selecting a preselected amount of previously milled and calcined ferrite material capable of being fired, to provide a body which may be permanently magnetized; submitting the particulate material in a dry state to the influence of a magnetic field at ambient temperature to magnetically-orient the particles; compressing the material while in the oriented state, machining in this unfired or green state, when desired; firing the compressed body; further machining the surface of the body, if necessary; and finally, submitting the body to the influence of a magnetic field for permanent magnetization thereof.

Heretofore, it has been the practice, when manufacturing anisotropic permanent magnets from ferrite particulate material to magnetically orient finely ground particles from a slurry suspension disposed in a non-magnetic die positioned between the poles of a magnetic yoke. (The term "anisotropic" being defined as a material having preferred orientation so that the magnetic characteristics are better along one axis than along any other axis.) The particles were previously oriented by subjecting them to a magnetic field during a period of draining and evaporation of the slurry liquid through perforated die punches. The formed body with its oriented crystalline structure was then dried and fired to sintering temperature, machined, and again magnetized to final state. This procedure was, and is, very satisfactory where bodies of limited thickness in the direction of orientation are required and where production schedules and costs are not of utmost concern. However, the limitations of the procedure will be readily apparent when high production techniques are a major factor to be considered. In addition, the size of the body is limited by economic aspects concerning die size, evaporation rates and size of magnetizing and pressing equipment, and the fact that the molds each require separate coils and magnetizing power sources of a steady field nature.

There have also been suggestions in the past for molding ferrite materials into shapes for use as permanent magnets. These methods have required the use of binders and the like to hold the particles together after molding and during the initial stage of firing. Such materials are difficult to remove and obviously contribute to a relatively porous structure. Finished pieces are subject to surface blistering and cracking caused during the "burn out" period for removal of the binder prior to sintering.

The present invention is directed to the production of permanent magnets from magnetically-anisotropic bodies which bodies are preferably formed into machinable compacts or billets without binder additions by means of hydrostatic or isostatic compression techniques. Shaped flexible bags or envelopes of a material, such as rubber, are filled with calcined, milled particles or crystalline ferrite material, which is in a dry state and without binder addition. The bag containing the material is then placed in the field of a conventional magnetizer, such as a pulse type magnetizer having a coil receiving its energy from periodic discharge of a bank of energized capacitors. Theoretically, of course, the source of magnetism may be from a static field, but obviously the energy level will be relatively lessened and thereby limit the size of body to be so oriented. The compressed, magnetically oriented body may be green machined to size and shape and then fired in accordance with conventional techniques.

The base or starting materials are conventional and and their selection does not form a part of this invention. For purposes of illustration, a typical formulation may comprise $Fe_2O_3$ and $BaCO_3$ in sufficient quantity to form upon calcining and firing, $BaO \cdot 6Fe_2O_3$, a known permanent magnet ferrite base material. In particular, a suitable mixture may comprise a ratio of 6 mol $Fe_2O_3$:1.13 mol $BaO$ in terms of oxides. As is the usual practice in the preparation of ferrite compositions, the weighed materials are thoroughly mixed, either in a dry or a wet state, and are either molded into compacts, granulated, or pressed into refractory containers for a subsequent heat treatment, or calcining operation. Calcining consists of heating the admixture of raw materials to a temperature in the range of 1925° F. to 2100° F. to chemically react and densify the composition. This operation may take place in either continuous or periodically heated furnaces.

After calcining, the reacted product is reduced in size by jaw crushing; in this case, the final size being reduced to pass a No. 14 sieve (U.S. Standard Mesh). After jaw crushing, the material is then wet ball-milled to approximately 1.0 micron in average particle size, filter pressed, dried and pulverized to destroy agglomerates.

At this stage, the sintered and sized material is then treated in accordance with the improved techniques of the present invention. As previously mentioned, it has been the more usual commercial practice heretofore to suspend the finely divided material in a liquid, such as water, disposed between the poles of a magnet and compressing the slurry while so suspended and magnetically oriented to achieve a desired shape and to squeeze out the suspending liquid. It will be obvious that such practice is quite impractical for use in high production facilities besides being messy and tedious. In addition, it will be obvious that previous procedures required special porous dies and individual magnetizing means for each die. Because of the problem of removing water and the requirement of individual magnetizing coils for each mold, the wet oriented members have also been limited in size.

The present invention will now be described in connection with the appended drawings wherein the various figures represent a series of stages in the manufacture of magnetic devices in accordance with the present invention and wherein:

FIG. 1 is a diagrammatic view of a flexible bag filled with ferrite materials and contained within a non-magnetic form and disposed with the field of a helical coil of a magnetizer, the bag and its contents being arranged to be seated on the platform of a pneumatic jolter for tamping purposes;

FIG. 2 is a diagrammatic view of the flexible bag containing ferrite powders which have been magnetically oriented in accordance with the teachings of FIG. 1 and which bag is shown in place in a hydrostatically operated pressure chamber;

FIG. 3 is a diagrammatic view illustrating the step of machining an unfired billet of compressed magnetically oriented materials;

FIG. 4 is a diagrammatic view illustrating the step of sintering the compacted and machined article in a conventional kiln;

FIG. 5 is a diagrammatic view of a final machining step which may be performed on the finished piece if required; in this case the view represents a surface grinding operation for providing a flat surface, as may be required.

The present invention contemplates the use of dry magnetic orientation and dry compression techniques as steps in the preparation to be taken prior to firing of a billet or other form of the permanently magnetizable material. Thus, magnetic orientation of the sintered and milled powder is accomplished by placing the powder 10 in a loosely packed condition in a shaped, flexible bag 11, of rubber or like material. For purposes of illustration, the individual bags 11 contain approximately 350 cubic inches of material and are approximately 7½ inches in width and 8 inches long to accommodate the particular magnetizing coil, to be later described. After filling, the bag is then closed by mechanical means (not shown), and suspended while being retained in a form 12 of non-magnetic material within the interior of the coil 13 of a magnetizer 14, such as a Raytheon #1103 Pulse Magnetizer. The bag 11 is slowly moved up and down the 7 inch effective length of the coil. (The length and diameter of coil being set forth for illustrative purposes only.) The coil 13 is connected to a source of power 15 and is loaded with seven, 3000 volt pulses over a one minute period to orient the particles. The particular pulse magnetizer 14 used provided approximately 15,000 oersted discharge force in a field having a diameter of 7 inches and effective 8 inch ±5% linearity. However, the discharge field energy may conceivably range between 10,000 and 17,000 oersteds. The magnetic pulses caused the particles of ferrite powder 10 to orient pole-to-pole. There is a definite visible change of appearance of the particles when they have been oriented, as seen when packed in a transparent plastic bag, for instance.

In certain instances, after an initial orienting step has taken place, it is desirable to provide an intermediate tamping step before again magnetically orienting the particles. This may be accomplished by seating the bag on a conventional tamping device 16, such as a pneumatically operated Syntron Jolter, while still in the bore of the magnetized coil 13, or as a separate step. One tamping cycle comprises 50 jolts. Other means of tamping, such as by high frequency vibration or magnetostrictive applications (not shown) may also be used. In general, the operational sequence of orient-tamp-orient appears to increase the degree of orientation of the fired piece and also slightly increases the flux of the green piece as indicated from a relative flux meter reading. It is within the scope of the present invention, however, to merely tamp the particles 10 contained within the bag 11 and to orient them thereafter in the manner above described.

Thus, if the intermediate step is used, the bag 11 containing the particulate material 10 is again placed in the magnetizer 14 for a final magnetic orientation in the same manner as above described. In any case, for purposes of compacting, a tamping step is desirable prior to orientation of the particles. It has also been determined that the use of an initial orienting step prior to tamping tends to provide resultant fired products of enhanced electrical properties, especially where there have been a number of variables affecting the initial ferrite mix, as, for instance, raw material selection and particle size.

After the particles have been magnetically oriented, the bag and its contents are sealed by means of opposed clamp bars 20 and carefully transferred to an hydrostatic press 21 along with other bags of like material. A threaded cover 22 is secured to the press cylinder to rest on a sealing ring 23. The press is then filled with water 24 or other liquid and closed. Pressure is then applied and evenly increased to approximately 15,000 p.s.i. over an eight minute period. It will be apparent that an isostatic press (not shown) may also be used, wherein the pressure medium is a flexible solid such as rubber, plastic or powders of various grain sizes. The equipment used in the present case is available commercially and, in this instance, the pressure may be varied from zero to 30,000 p.s.i. in a chamber of 10 inch diameter and 40 inches long. A billet approximately 8 inches in diameter by 30 inches long in pressed dimension can be processed in the press.

The pressure is then released, the clamps 20 removed from the bag 11 and the pressed ferrite material removed from the rubber bags as solid billets 25. As stated previously, the size of the bag is limited only by the effective coil length of the magnetizer, and it is conceivable that a bag 30 inches to 40 inches long can be processed in the particular press used. Checking with a ferrite pincushion magnet suspended from a thread revealed the compressed billet 25 to be magnetic with north and south poles running in the direction established on the powder when oriented in the pulse magnetizer coil.

After pressing the billets 25 may be green machined if desired, in either a magnetized or demagnetized state. As shown in FIG. 3 the billet 25 is being cut into smaller sections 26 by means of a conventional abrasive wheel. Demagnetizing may be accomplished by placing the billet 25 within a pulsed field of approximately 2100 oersteds. At times it may be desirable to machine the article while in the magnetized state to provide a dust-free operation as the particles will tend to cling together after being chipped from the machined piece. Various machining techniques have been used with success and include operations such as abrasive wheel cutting, band sawing, milling, surface grinding, lathe turning and belt sanding. Each of these machining techniques have proved to be excellent despite the fact that the material contains no binders or lubricants of any kind.

The pressed billets 25 or pressed and machined pieces 26 are then placed on a car 27 loaded directly to a tunnel type kiln 28 at heat temperatures of between 2100° F. and 2275° F. with a 2100° F. peak temperature in an atmosphere of air, with a 24 inch per hour push speed. After firing, the sections or pieces 26 are cooled at the rate of 350° F. in an atmosphere of air. It has been found that the heating and cooling rates may be successfully varied from 100° F. to 600° F. per hour. The fired piece may be machined again if desired and then re-magnetized in the same coil used in orienting the powder, and under the same conditions. The north and south pole orientation will be found to be as previously established prior to firing. Final machining (see FIG. 5) has only been found to be necessary where a flatness specification on the final product is set forth. In general, fired size has been held to ±0.5% by controlling green machined size.

Electromagnetic measurements have been made from cubes 1 inch by 1 inch by 1 inch in size with the following results:

Maximum permeability—$(BH)_{max}=3.2\times 10^6$ gauss-oersted (at H=1560 oersteds)
Residual induction—$Br=3750$ gauss
Normal coercive force—$Hcn=1700$ oersteds
Intrinsic coercive force—$Hci=1800$ oersteds
Degree of orientation=84%

The dry orientation and pressing technique of the present invention produces material of low porosity (in terms of Law Ratio of Air Voids to Solids) and high strength in its green (unfired) form. This provides green forms which may be easily machined by conventional metal forming techniques, i.e.: grinding, turning, sawing, milling, drilling, etc. As a result of this machinability, articles can be produced in all presently conceivable shapes and sizes with no necessity for the construction of expensive molding dies.

The advantages over slurry or wet orienting lie in the simplicity of processing technique, simplicity of apparatus and quality of the final product, i.e.: absence of physical flaws. The size of the final product appears to be limited only by the size of the hydrostatic press chamber. Other advantages inherent in the present apparatus and method lie in the relative thickness in the degree of orientation, the dry method of this invention being limited thus far to a billet approximately 4 inches thick in the direction of orientation, whereas wet process billets are limited to 1 inch or less in thickness in the direction of orientation. There is no die cost in the present apparatus and the magnetizing coil used is rugged and very inexpensive. Grinding costs in the present procedure are normally zero, whereas such costs range between 10% and 15% of the price cost. As emphasized above the green machinability in accordance with the present technique is excellent, whereas under prior art procedures such machinability is very poor.

Another important feature of the present invention lies in the fact that the fired density is uniform throughout even the more intricately formed pieces. The fired pieces are free of cracks, voids and flaws. Wet process fired pieces vary in porosity and possess shrinkage cracks, as do pieces pressed dry, but with binders or lubricants pressed therewith.

I claim:

1. In the method of manufacturing permanent magnets, including steps of admixing, calcining and forming raw material which upon firing to a sinterable temperature provides an object capable of being anisotropically magnetized, and sintering said material; the improvement in combination therewith: comprising the steps, prior to sintering and finally magnetizing said object of filling a flexible non-magnetic container with a pulverized, calcined, binder-free, permanent magnet material in the dry state, positioning said filled container within the effective length of the coil of a magnetizer and subjecting the magnet material to the magnetizing force of said magnetizer to anisotropically orient the particles of said material in a preselected direction relative to the axis of said coil, sealing the flexible container to retain the anisotropically oriented material and placing the same within the confines of a static type compression chamber, sealing said chamber and introducing a compression media therein, and gradually applying pressure to the media to compress the dry oriented magnet material into a self-sustaining billet.

2. In the method of manufacturing permanent magnets, including steps of admixing, calcining and forming raw material which upon firing to a sinterable temperature provides an object capable of being anisotropically magnetized, and sintering said material; the improvement in combination therewith: comprising the steps of filling a flexible non-magnetic container with a pulverized, calcined, binder-free, permanent magnet material in the dry state, tamping the permanent magnet material while in said container to densify the same, positioning the filled and tamped container within the effective length of the coil of a magnetizer and subjecting the magnet material to the magnetizing force of said magnetizer to anisotropically orient the particles of said material in a preselected direction relative to the axis of said coil, sealing the flexible container to retain the anisotropically oriented material and placing the same within the confines of a static type compression chamber, sealing said chamber and introducing a compression media therein, and gradually applying pressure to the media to compress the dry oriented magnet material into a self-sustaining billet.

3. In the method of manufacturing permanent magnets, including steps of admixing, calcining and forming raw material which upon firing to a sinterable temperature provides an object capable of being anisotropically magnetized, and sintering said material; the improvement in combination therewith: comprising the steps of filling a flexible non-magnetic container with a pulverized, calcined, binder-free, permanent magnet material in the dry state, positioning said filled container within the effective length of the coil of a magnetizer and subjecting the magnet material to the magnetizing force of said magnetizer to anisotropically orient the particles of said material in a preselected direction relative to the axis of said coil, tamping the permanent magnet material to densify the same, again subjecting the tamped material to the influence of the magnetic field of said magnetizer coil to complete the magnetic orientation of the same, sealing the flexible container to retain the anisotropically oriented material and placing the same within the confines of a static type compression chamber, sealing said chamber and introducing a compression media therein, gradually applying pressure to the media to compress the dry oriented magnet material into a self-sustaining billet.

4. In the method of manufacturing permanent magnets, including steps of admixing, calcining and forming raw material which upon firing to a sinterable temperature provides an object capable of being anisotropically magnetized, and sintering said material; the improvement in combination therewith: comprising the steps of filling a flexible non-magnetic container with a pulverized, calcined, binder-free, permanent magnet material in the dry state, tamping the permanent magnet material to densify the same, positioning the filled and tamped container within the effective length of the coil of a magnetizer and subjecting the magnet material to the magnetizing force of said magnetizer to anisotropically orient the particles of said material in a preselected direction relative to the axis of said coil, sealing the flexible container to retain the anisotropically oriented material and placing the same within the confines of a static type compression chamber, sealing said chamber and introducing a compression media therein, gradually applying pressure to the media to compress the dry oriented magnet material into a self-sustaining billet, removing the compressed billet from the container and machining said billet to a preselected form.

5. In the method of manufacturing permanent magnets, including steps of admixing, calcining and forming raw material which upon firing to a sinterable temperature provides an object capable of being anisotropically magnetized, and sintering said material; the improvement in combination therewith: comprising the steps of filling a flexible non-magnetic container with a pulverized, calcined, binder-free, permanent magnet material in the dry state, positioning said filled container within the effective length of the coil of a pulse type magnetizer and subjecting the magnet material to the magnetizing force of said magnetizer to anisotropically orient the particles of said material in a preselected direction relative to the axis of said coil, sealing the flexible container to retain the anisotropically oriented material and placing the same within the confines of an hydrostatic type compression chamber, sealing said chamber and filling the same with water, gradually applying pressure to the water to compress the dry oriented magnet material into a self-sustaining billet.

References Cited in the file of this patent

UNITED STATES PATENTS

| | | |
|---|---|---|
| 2,188,091 | Bearmann | June 23, 1940 |
| 2,648,125 | McKenna et al. | Aug. 11, 1953 |
| 2,960,470 | Loosjes et al. | Nov. 15, 1960 |
| 2,984,871 | Venerus | May 23, 1961 |